United States Patent
DiBella, Jr. et al.

(10) Patent No.: US 12,509,542 B2
(45) Date of Patent: Dec. 30, 2025

(54) HIGH WATER CONTENT BIOMEDICAL DEVICES

(71) Applicant: Bausch + Lomb Ireland Limited, Dublin (IE)

(72) Inventors: James Anthony DiBella, Jr., Macedon, NY (US); Feng-Yang Shih, Lafayette, CO (US); Mark R. Mis, Rush, NY (US); Lindsey Cullen, Fairport, NY (US); Sandra Taft, Rochester, NY (US); Alok Kumar Awasthi, Pittsford, NY (US)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 844 days.

(21) Appl. No.: 17/828,450

(22) Filed: May 31, 2022

(65) Prior Publication Data
US 2023/0047871 A1 Feb. 16, 2023

Related U.S. Application Data

(60) Provisional application No. 63/217,006, filed on Jun. 30, 2021.

(51) Int. Cl.
C08F 251/00 (2006.01)
A61L 27/26 (2006.01)
G02B 1/04 (2006.01)

(52) U.S. Cl.
CPC ............ C08F 251/00 (2013.01); A61L 27/26 (2013.01); G02B 1/043 (2013.01); A61L 2430/16 (2013.01)

(58) Field of Classification Search
CPC ............ B29D 11/00038; C08F 251/00; C08F 290/10; C08J 2351/02; C08J 2305/08; C08J 3/075; C08B 37/0063; C08B 37/0069; C08B 37/0072; C08B 37/0075; C08B 37/08; C08L 5/08
USPC .......................................................... 514/56
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 4,113,224 A | 9/1978 | Clark et al. |
| 4,197,266 A | 4/1980 | Clark et al. |
| 4,555,732 A | 11/1985 | Tuhro |
| 4,910,277 A | 3/1990 | Bambury et al. |
| 5,070,215 A | 12/1991 | Bambury et al. |
| 5,271,875 A | 12/1993 | Appleton et al. |
| 6,517,933 B1 | 2/2003 | Soane et al. |
| 7,521,434 B2 | 4/2009 | Leshchiner et al. |
| 7,674,781 B2 | 3/2010 | Sheardown et al. |
| 8,530,532 B2 | 9/2013 | Chang et al. |
| 9,345,814 B2 | 5/2016 | Ding |
| 10,167,387 B2 | 1/2019 | James et al. |
| 10,335,490 B2 | 7/2019 | Leipzig et al. |
| 10,626,267 B2 | 4/2020 | James et al. |
| 10,689,464 B2 | 6/2020 | Dusankova et al. |
| 10,933,140 B2 | 3/2021 | Chu et al. |
| 2003/0044468 A1 | 3/2003 | Cellesi et al. |
| 2005/0244363 A1 | 11/2005 | Hossainy et al. |
| 2007/0293648 A1 | 12/2007 | Sheardown et al. |
| 2010/0048755 A1 | 2/2010 | Chow et al. |
| 2013/0171197 A1 | 7/2013 | Ho et al. |
| 2013/0172985 A1 | 7/2013 | Prestwich et al. |
| 2013/0303695 A1 | 11/2013 | Sheardown et al. |
| 2021/0189018 A1 | 6/2021 | Olsen et al. |

FOREIGN PATENT DOCUMENTS

WO 2012027834 A1 3/2012
WO PCT/EP2022/066540 A1 10/2022

OTHER PUBLICATIONS

Weeks et al, Journal of Biomedical Materials Research Part A, 2012, 100A (8), 1972-1982.*
Lynch et al, Journal of Biomedical Materials Research B: Applied Biomaterials, 2017, 105b (7), 1863-1873.*
Weeks et al., "Photocrosslinkable hyaluronic acid as an internal wetting agent in model conventional and silicon hydrogel contact lenses", Journal of Biomedical Materials Research Part A, Aug. 5, 2012, pp. 1972-1982, vol. 100A, No. 8.

* cited by examiner

*Primary Examiner* — Ganapathy Krishnan
(74) *Attorney, Agent, or Firm* — Michael E. Carmen; John E. Thomas

(57) ABSTRACT

A biomedical device is disclosed. The biomedical device includes a polymerization product of a biomedical device-forming mixture containing (a) one or more grafted glycosaminoglycan polymers including a glycosaminoglycan having a polymer backbone and one or more side chains comprising an ethylenically unsaturated reactive-containing residue grafted onto the polymer backbone, and (b) one or more non-silicone biomedical device-forming monomers.

20 Claims, No Drawings

HIGH WATER CONTENT BIOMEDICAL DEVICES

PRIORITY CLAIM

The present application claims priority to U.S. Provisional Patent Application Ser. No. 63/217,006, entitled "High Water Content Biomedical Devices," filed Jun. 30, 2021, the content of which is incorporated by reference herein in its entirety.

BACKGROUND

It is highly desirable that a contact lens be as comfortable as possible for wearers. Manufacturers of contact lenses are continually working to improve the comfort of the lenses. Nevertheless, many people who wear contact lenses still experience dryness or eye irritation throughout the day and particularly towards the end of the day. An insufficiently wetted lens at any point in time will cause significant discomfort to the lens wearer. Although wetting drops can be used as needed to alleviate such discomfort, it would certainly be desirable if such discomfort did not arise in the first place.

Glycosaminoglycans (GAGs) are a group of polysaccharides built of repeating disaccharide units. Due to high polarity and water affinity, they can be found in many systems of human and animal bodies. For example, GAGs occur on the surface of cells and in the extracellular matrix of animal organisms such as skin, cartilage, and lungs.

GAGs each have a chemical structure including a repeating basal disaccharide structure consisting of uronic acid and hexosamine and being optionally sulfated to various degrees. GAGs are mainly classified, depending on the disaccharides constituting them, into three groups: a first group of compounds composed of chondroitin sulfate or dermatan sulfate, a second group of compounds composed of heparan sulfate or heparin, and a third group of hyaluronic acid compounds. For example, the compounds composed of chondroitin sulfate or dermatan sulfate consist of a disaccharide:uronic acid (glucuronic acid or iduronic acid) ($\beta 1 \rightarrow 3$) N-acetylgalactosamine, the compounds composed of heparan sulfate or heparin consist of a disaccharide:uronic acid (glucuronic acid or iduronic acid) ($\beta 1 \rightarrow 4$) N-acetylglucosamine, and the hyaluronic acid consists of a disaccharide:glucuronic acid ($\beta 1 \rightarrow 3$)N-acetylglucosamine. In addition, the structure is highly diverse due to a combination with modification by sulfation.

These GAGs are known as biological materials having both physicochemical properties derived from characteristic viscoelasticity and biological properties mediated by interactions with various functional proteins, depending on the molecular size and the sulfation pattern.

SUMMARY

In accordance with an illustrative embodiment, a biomedical device comprises a polymerization product of a biomedical device-forming mixture comprising (a) one or more grafted glycosaminoglycan polymers comprising a glycosaminoglycan having a polymer backbone and one or more side chains comprising an ethylenically unsaturated reactive-containing residue grafted onto the polymer backbone, and (b) one or more non-silicone biomedical device-forming monomers.

In accordance with another illustrative embodiment, a method for making a biomedical device comprises (a) providing a biomedical device-forming mixture comprising (i) one or more grafted glycosaminoglycan polymers comprising a glycosaminoglycan having a polymer backbone and one or more side chains comprising an ethylenically unsaturated reactive-containing residue grafted onto the polymer backbone, and (ii) one or more non-silicone biomedical device-forming monomers; (b) subjecting the mixture to polymerization conditions to provide a polymerized biomedical device; and (c) hydrating the polymerized biomedical device.

DETAILED DESCRIPTION

Various non-limiting illustrative embodiments described herein are directed to biomedical devices obtained from one or more grafted glycosaminoglycan polymers comprising a glycosaminoglycan having a polymer backbone and one or more side chains comprising an ethylenically unsaturated reactive-containing residue grafted onto the polymer backbone which are polymerized with one or more non-silicone biomedical device-forming monomers.

In the field of biomedical devices such as contact lenses, various physical and chemical properties such as, for example, oxygen permeability, wettability, material strength and stability, are but a few of the factors that must be carefully balanced in order to provide a useable contact lens. For example, since the cornea receives its oxygen supply from contact with the atmosphere, good oxygen permeability is an important characteristic for certain contact lens materials. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

Although lenses with high-water content are softer, more lubricious and more comfortable to wear, such lenses may not have one or more properties useful to provide comfortable and safe wearing of the contact lenses. Hydrogels represent a desirable class of materials for many biomedical applications, including contact lenses and intraocular lenses. Hydrogels are hydrated, crosslinked polymeric systems that contain water in an equilibrium state. Silicone hydrogels are a known class of hydrogels and are characterized by the inclusion of a siloxy-containing material. An advantage of silicone hydrogels over non-silicone hydrogels is that the silicone hydrogels typically have higher oxygen permeability due to the inclusion of the siloxy-containing monomer. For example, the presently available non-silicone hydrogels shown below in Table 1 have the following water content and oxygen permeability (Dk).

TABLE 1

| Lens | Water Content | Dk |
|---|---|---|
| polymacon | 38 | 8 |
| hilafilcon B | 59 | 22 |
| alphafilcon A | 66 | 32 |
| nelfilcon A | 69 | 26 |
| nesofilcon A | 78 | 42 |

The biomedical devices described in exemplary embodiments herein overcome the drawbacks of the non-silicone hydrogels described above and advantageously contain a high-water content and/or possess a high oxygen permeability (Dk) as described below. Thus, the biomedical devices disclosed herein will exhibit both suitable physical and chemical properties, e.g., oxygen permeability, lubriciousness and wettability, for prolonged contact with the body. In addition, the grafted glycosaminoglycan polymers employed in making the biomedical devices are believed to advantageously exhibit less enzymatic, oxidative and thermal degradation and thus higher stability, longer shelf life and rigidity of desired conformation.

The biomedical devices disclosed herein are intended for direct contact with body tissue or body fluid. The term "biomedical device" as used herein is any article that is designed to be used while either in or on mammalian tissues or fluid, and preferably in or on human tissue or fluids. Representative examples of biomedical devices include, but are not limited to, artificial ureters, diaphragms, intrauterine devices, heart valves, catheters, denture liners, prosthetic devices, and ophthalmic lens applications, where the lens is intended for direct placement in or on the eye, such as, for example, intraocular devices and contact lenses. In one illustrative embodiment, a biomedical device is an ophthalmic device, particularly a contact lens, and more particularly a contact lens made from silicone hydrogels.

As used herein, the term "ophthalmic device" refers to devices that reside in or on the eye. These devices can provide optical correction, wound care, drug delivery, diagnostic functionality or cosmetic enhancement or effect or a combination of these properties. Useful ophthalmic devices include, but are not limited to, ophthalmic lenses such as soft contact lenses, e.g., a soft, hydrogel lens, soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking.

In a non-limiting illustrative embodiment, a biomedical device disclosed herein will be a high-water content biomedical device. For example, in an illustrative embodiment, a high-water content biomedical device will have an equilibrium water content of at least about 80 weight percent. In another illustrative embodiment, a high-water content biomedical device will have an equilibrium water content of from about 80 weight percent to about 90 weight percent.

In another non-limiting illustrative embodiment, a biomedical device disclosed herein will exhibit a high oxygen permeability (also referred to as Dk). For example, in one illustrative embodiment, a biomedical device disclosed herein will exhibit an oxygen permeability of at least about 60. In one illustrative embodiment, a biomedical device disclosed herein will exhibit an oxygen permeability of at least about 70. In one illustrative embodiment, a biomedical device disclosed herein will exhibit an oxygen permeability, reported in Dk (or barrer) units, of from about 60 to about 80.

In one illustrative embodiment, a biomedical device described in exemplary embodiments herein will contain a high-water content and exhibit a high oxygen permeability in any of the foregoing ranges. For example, in an illustrative embodiment, a biomedical device disclosed herein will have an equilibrium water content of at least about 80 weight percent and exhibit an oxygen permeability of at least about 60. In another illustrative embodiment, a biomedical device disclosed herein will have an equilibrium water content of at least about 80 weight percent and exhibit an oxygen permeability of at least about 70. In one illustrative embodiment, a biomedical device disclosed herein will have an equilibrium water content of from about 80 weight percent to about 90 weight percent and exhibit an oxygen permeability of from about 60 to about 80.

In non-limiting illustrative embodiments, a biomedical device disclosed herein is formed from a polymerization product of a biomedical device-forming mixture comprising (a) one or more grafted glycosaminoglycan polymers comprising a glycosaminoglycan having a polymer backbone and one or more side chains comprising an ethylenically unsaturated reactive residue grafted onto the polymer backbone, and (b) one or more non-silicone biomedical device-forming monomers.

A glycosaminoglycan (GAG) is one molecule with many alternating subunits. In general, GAGs are represented by the formula A-B-A-B-A-B, where A is an uronic acid and B is an amino sugar that may or may not be either O- or N-sulfated, where the A and B units can be heterogeneous with respect to epimeric content or sulfation. Any natural or synthetic polymer containing uronic acid can be used. Other GAGs are sulfated at different sugars. There are many different types of GAGs having commonly understood structures such as, for example, chondroitin sulfate (e.g., chondroitin 4- and 6-sulfates), heparan, heparin sulfate, heparosan, dermatan, dermatan sulfate, hyaluronic acid or a salt thereof, e.g., sodium hyaluronate or potassium hyaluronate, keratan sulfate, and other disaccharides such as sucrose, lactulose, lactose, maltose, trehalose, cellobiose, mannobiose and chitobiose. Glycosaminoglycans can be purchased from Sigma, and many other biochemical suppliers such as HTL Biotechnology (France). For example, in an illustrative embodiment, the GAG is hyaluronic acid or a salt thereof. In another illustrative embodiment, the GAG is chondroitin sulfate.

The GAGs will have a reactive functional group in the polymer backbone for grafting the ethylenically unsaturated reactive residue onto the backbone. Suitable reactive functional groups in the polymer backbone include carboxylate-containing groups, hydroxyl-containing groups, silicone hydride groups, sulfur-containing groups such as thiols and other groups including polymerizable functionalities such as allylic, vinylic, acrylate, methacylate, methacrylamide etc. In addition, the sugar rings of the GAGs can be opened to form aldehydes for further functionalization. The GAGs for use herein can have a weight average molecular weight ranging from about 10,000 to about 3,000,000 Daltons (Da) in which the lower limit is from about 10,000, about 20,000, about 30,000, about 40,000, about 50,000, about 60,000, about 70,000, about 80,000, about 90,000, or about 100,000, and the upper limit is about 200,000, about 300,000, about 400,000, about 500,000, about 600,000, about 700,000, about 800,000, about 900,000, about 1,000,000, or about up to 2,800,000 Da, where any of the lower limits can be combined with any of the upper limits.

Hyaluronic acid is a well-known, naturally occurring, water soluble biodegradable polymer composed of two alternatively linked sugars, D-glucuronic acid and N-acetylglucosamine, linked via alternating $\beta$-(1,4) and $\beta$-(1,3) glycosidic bonds. Hyaluronic acid is a non-sulfated GAG. The polymer is hydrophilic and highly viscous in an aqueous solution at relatively low solute concentrations. It often occurs naturally as the sodium salt, sodium hyaluronate. However, other salts are contemplated herein such as, for example, potassium hyaluronate. Methods of preparing commercially available hyaluronan and salts thereof are well known. Hyaluronan can be purchased from Seikagaku Company, Clear Solutions Biotech, Inc., Pharmacia Inc., Sigma Inc., and many other suppliers HTL Biotechnology, Contipro and Bloomage Biotechnology Corporation. Hyaluronic acid has repeating units of the structure represented by the following formula:

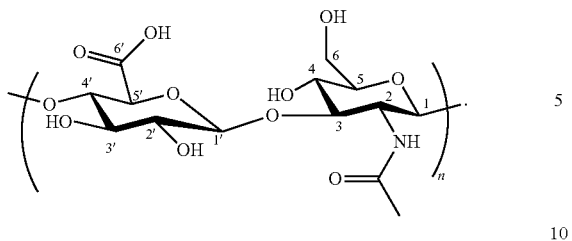

Accordingly, the repeating units in hyaluronic acid can be as follows:

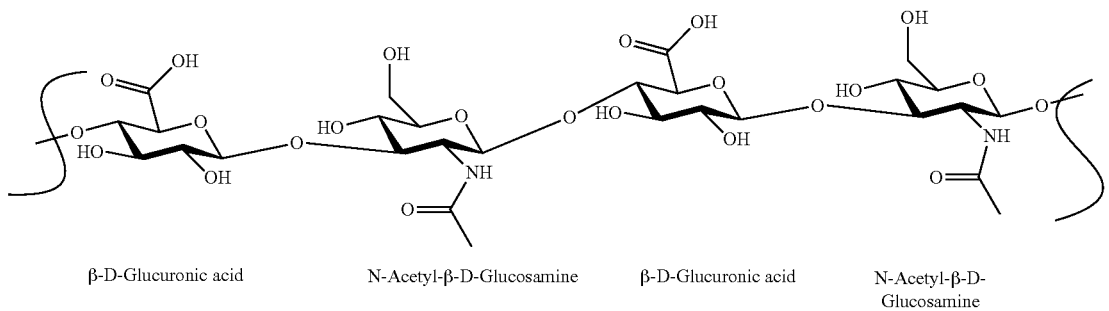

β-D-Glucuronic acid     N-Acetyl-β-D-Glucosamine     β-D-Glucuronic acid     N-Acetyl-β-D-Glucosamine In general, hyaluronic acid or a salt thereof can have from about 2 to about 1,500,000 disaccharide units. In one embodiment, hyaluronic acid or a salt thereof can have a weight average molecular weight ranging from about 10,000 to about 3,000,000 Da in which the lower limit is from about 10,000, about 20,000, about 30,000, about 40,000, about 50,000, about 60,000, about 70,000, about 80,000, about 90,000, or about 100,000, and the upper limit is about 200,000, about 300,000, about 400,000, about 500,000, about 600,000, about 700,000, about 800,000, about 900,000, about 1,000,000, or about up to 2,800,000 Da, where any of the lower limits can be combined with any of the upper limits.

Chondroitin sulfate is a linear sulfated polysaccharide composed of repeating β-D-glucuronic acid (GlcA) and N-acetyl-β-D-galactosamine (GalNAc) units arranged in the sequence by GlcA-β(1,3)-GalNAc-β(1,4) glycosidic bonds. In one embodiment, chondroitin sulfate has one or more repeating units of the structure represented by the following formula:

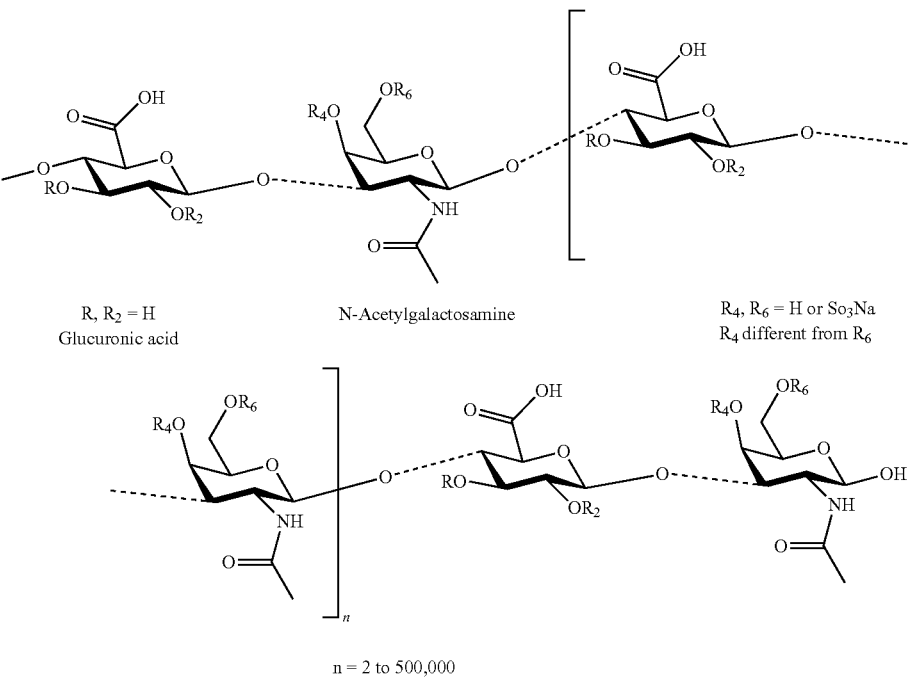

R, $R_2$ = H     N-Acetylgalactosamine     $R_4$, $R_6$ = H or $So_3Na$
Glucuronic acid                                                    $R_4$ different from $R_6$ n = 2 to 500,000

In an illustrative embodiment, chondroitin sulfate has repeating units of the structure represented by the following formula:

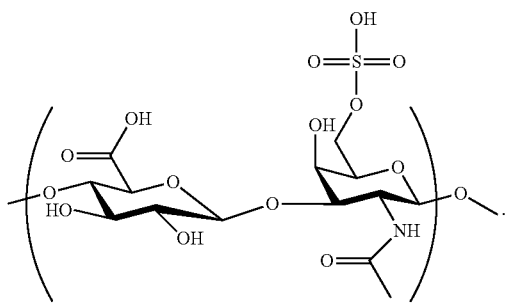

In general, chondroitin sulfate can have from about 2 to about 1,500,000 repeating units. In one embodiment, chondroitin sulfate can have a weight average molecular weight ranging from about 10,000 to about 3,000,000 Da in which the lower limit is from about 5,000, 10,000, about 20,000, about 30,000, about 40,000, about 50,000, about 60,000, about 70,000, about 80,000, about 90,000, or about 100,000, and the upper limit is about 200,000, about 300,000, about 400,000, about 500,000, about 600,000, about 700,000, about 800,000, about 900,000, about 1,000,000, or about 3,000,000 Da, where any of the lower limits can be combined with any of the upper limits.

In an illustrative embodiment, dermatan sulfate has repeating units of the structure represented by the following formula:

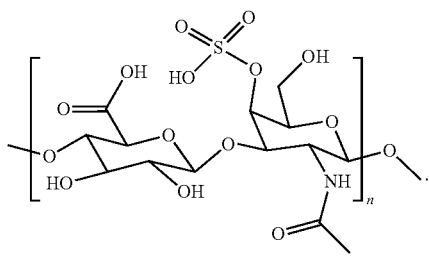

In general, dermatan sulfate can have from about 2 to about 1,500,000 repeating units. In one embodiment, chondroitin sulfate can have a weight average molecular weight ranging from about 10,000 to about 3,000,000 Da in which the lower limit is from about 5,000, 10,000, about 20,000, about 30,000, about 40,000, about 50,000, about 60,000, about 70,000, about 80,000, about 90,000, or about 100,000, and the upper limit is about 200,000, about 300,000, about 400,000, about 500,000, about 600,000, about 700,000, about 800,000, about 900,000, about 1,000,000, or about 3,000,000 Da, where any of the lower limits can be combined with any of the upper limits.

In an illustrative embodiment, heparin and heparin sulfate has repeating units of the structure represented by the following formula:

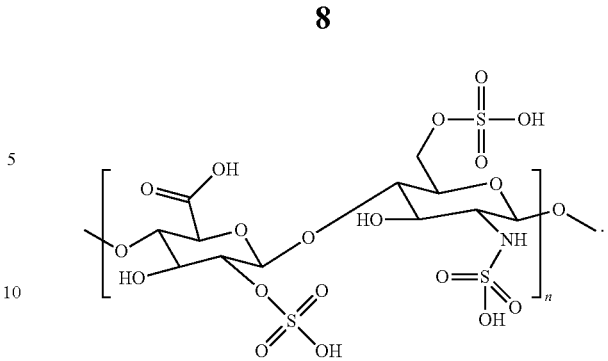

In general, heparin and heparin sulfate can have from about 2 to about 1,500,000 repeating units. In one embodiment, chondroitin sulfate can have a weight average molecular weight ranging from about 10,000 to about 3,000,000 Da in which the lower limit is from about 5,000, 10,000, about 20,000, about 30,000, about 40,000, about 50,000, about 60,000, about 70,000, about 80,000, about 90,000, or about 100,000, and the upper limit is about 200,000, about 300,000, about 400,000, about 500,000, about 600,000, about 700,000, about 800,000, about 900,000, about 1,000,000, or about 3,000,000 Da, where any of the lower limits can be combined with any of the upper limits.

In an illustrative embodiment, keratan sulfate has repeating units of the structure represented by the following formula:

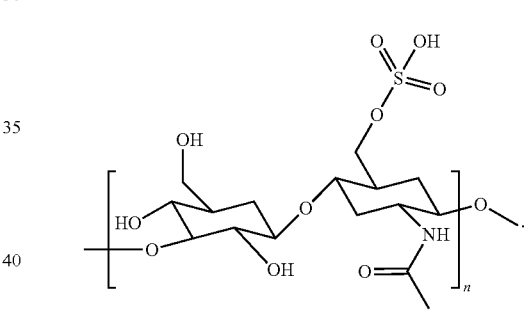

In general, keratan sulfate can have from about 2 to about 1,500,000 repeating units. In one embodiment, chondroitin sulfate can have a weight average molecular weight ranging from about 10,000 to about 3,000,000 Da in which the lower limit is from about 5,000, 10,000, about 20,000, about 30,000, about 40,000, about 50,000, about 60,000, about 70,000, about 80,000, about 90,000, or about 100,000, and the upper limit is about 200,000, about 300,000, about 400,000, about 500,000, about 600,000, about 700,000, about 800,000, about 900,000, about 1,000,000, or about 3,000,000, where any of the lower limits can be combined with any of the upper limits.

The ethylenically unsaturated reactive-containing residue grafted onto a reactive functional group in the polymer backbone of the GAG is derived from a monomer comprising an ethylenically unsaturated reactive group and at least one reactive end group. In one embodiment, the ethylenically unsaturated reactive-containing residue is a methacrylate-containing residue. The at least one reactive end group includes a reactive functional group capable of grafting on to a complementary reactive functional group in the polymer backbone of the GAG. Suitable reactive functional groups of the monomer comprising an ethylenically unsaturated reactive group and at least one reactive end group include, for example, a halogen, an anhydride, an amino group, an aldehyde group, a carboxylic acid group, an alcohol group, a thiol group, a hydrazide group, a glycidyl group, etc. In one non-limiting illustrative embodiment, an ethylenically unsaturated reactive-containing residue can be derived from, for example, methacrylic anhydride, methacryloyl chloride, 2-isocyanoethylmethacrylate, 3-(trimethoxysilyl)propyl methacrylate, 3-(chlorodimethylsilyl)propyl methacrylate, glycidyl methacrylate, methacryloyl hydrazide, aminoethyl methacrylate, vinyl chloroformate, allyl chloride, acryloyl chloride, and acrylic anhydride. However, other monomers for forming the ethylenically unsaturated reactive-containing residue on the polymer backbone of the GAG are contemplated and the foregoing list is merely exemplary.

The grafted glycosaminoglycan polymers disclosed herein can be obtained by grafting the at least one reactive end group of the one or more monomers comprising an ethylenically unsaturated reactive group onto a complementary reactive functionality in the polymer backbone of the glycosaminoglycan. For example, in one illustrative embodiment, an anhydride group of the one or more monomers comprising an ethylenically unsaturated reactive group can be grafted onto a carboxylic acid group in the polymer backbone of the glycosaminoglycan. In non-limiting illustrative embodiments, the graft polymerization reaction can obtain a degree of grafting, i.e., the number of sidechains in the polymer backbone containing the ethylenically unsaturated reactive-containing residue, ranging from about 0.5 to about 50%. In another illustrative embodiment, the degree of grafting can range from about 2 to about 30%. In another illustrative embodiment, the degree of grafting can range from about 5 to about 20%. In yet another illustrative embodiment, the degree of grafting can range from about 5 to about 15%. In yet another illustrative embodiment, the degree of grafting can range from about 5 to about 10%.

In general, the GAG and monomer comprising an ethylenically unsaturated reactive group and at least one reactive end group can be added sequentially or simultaneously to a reaction mixture. The reaction can be carried out at a suitable temperature and for a time period for the completion of the reaction to maximize the yield of the product ethylenically unsaturated reactive-containing residue grafted onto the polymer backbone of the glycosaminoglycan. For example, a suitable temperature and time period includes a temperature ranging from about 10 to about 40° C. and a time period ranging from about 4 hours to about 48 hours. In an illustrative embodiment, a suitable temperature and time period includes a temperature ranging from about 15 to about 25° C. and a time period ranging from about 8 hours to about 24 hours.

In an illustrative embodiment, a glycosaminoglycan can be added to the reaction mixture in an amount ranging from about 0.5 wt. % to about 5 wt. %, based on the total weight of the reaction mixture. In one illustrative embodiment, a glycosaminoglycan can be added to the reaction mixture in an amount ranging from about 1 wt. % to about 3 wt. 00 based on the total weight of the reaction mixture.

In an illustrative embodiment, a monomer comprising an ethylenically unsaturated reactive group and at least one reactive end group can be added to the reaction mixture in an amount ranging from about 0.1 wt. % to about 5 wt. %, based on the total weight of the reaction mixture. In one illustrative embodiment, a monomer comprising an ethylenically unsaturated reactive group and at least one reactive end group can be added to the reaction mixture in an amount ranging from about 0.5 wt. % to about 2 wt. %, based on the total weight of the reaction mixture.

In a non-limiting illustrative embodiment, the ethylenically unsaturated reactive-containing residue is a methacrylate-containing residue derived from a methacrylate-containing monomer as described above, and the degree of methacrylation can range from about 0.5 to about 50%. In another illustrative embodiment, the degree of methacrylation can range from about 2 to about 30%. In yet another illustrative embodiment, the degree of methacrylation can range from about 5 to about 15%.

The resulting grafted glycosaminoglycan polymer can be a random copolymer or a block copolymer. In one illustrative embodiment, a grafted glycosaminoglycan polymer disclosed herein can have a weight average molecular weight ranging from about 20,000 to about 6,000,000 Da in which the lower limit is from about 20,000, about 30,000, about 40,000, about 50,000, about 60,000, about 70,000, about 80,000, about 90,000, or about 100,000 Da, and the upper limit is about 100,000, about 150,000, about 200,000, about 300,000, about 400,000, about 500,000, about 600,000, about 700,000, about 800,000, about 900,000, about 1,000,000, about 2,000,000, about 3,000,000, about 4,000,000, about 5,000,000 or up to about 6,000,000 Da, wherein any of the lower limits can be combined with any of the upper limits.

The resulting grafted glycosaminoglycan polymer can be present in the biomedical device-forming mixture in an amount ranging from about 0.1 to about 2 wt. %, based on the total weight of the biomedical device-forming mixture. In another embodiment, a resulting grafted glycosaminoglycan polymer can be present in the biomedical device-forming mixture in an amount ranging from about 0.25 to about 1.5 wt. %, based on the total weight of the biomedical device-forming mixture.

In a non-limiting illustrative embodiment, suitable one or more non-silicone biomedical device-forming monomers for including in the biomedical device-forming mixture include, for example, one or more non-silicone hydrophilic monomers. Representative examples of one or more non-silicone hydrophilic monomers include unsaturated carboxylic acids, acrylamides, vinyl lactams, poly(alkyleneoxy)(meth)acrylates, hydroxyl-containing-(meth)acrylates, hydrophilic vinyl carbonates, hydrophilic vinyl carbamates, hydrophilic oxazolones, and poly(alkene glycols) functionalized with polymerizable groups and the like and mixtures thereof. Representative examples of unsaturated carboxylic acids include methacrylic acid, acrylic acid and the like and mixtures thereof. Representative examples of amides include alkylamides such as N,N-dimethylacrylamide, N,N-dimethylmethacrylamide and the like and mixtures thereof. Representative examples of cyclic lactams include N-vinyl-2-pyrrolidone, N-vinyl caprolactam, N-vinyl-2-piperidone and the like and mixtures thereof. Representative examples of hydroxyl-containing (meth)acrylates include 2-hydroxyethyl methacrylate, glycerol methacrylate and the like and mixtures thereof. Representative examples of functionalized poly(alkene glycols) include poly(diethylene glycols) of varying chain length containing monomethacrylate or dimethacrylate end caps. In one embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. Mixtures of the foregoing non-silicone-containing hydrophilic monomers can also be used in the monomeric mixtures herein.

In an illustrative embodiment, the one or more non-silicone biomedical device-forming monomers can be present in the biomedical device-forming mixture in an amount ranging from about 30 to about 90 wt. %, based on the total weight of the biomedical device-forming mixture. In another illustrative embodiment, the one or more non-silicone biomedical device-forming monomers can be present in the biomedical device-forming mixture in an amount ranging from about 45 to about 75 wt. %, based on the total weight of the biomedical device-forming mixture.

In an illustrative embodiment, the biomedical device-forming mixture can further include one or more hydrophobic monomers. Suitable hydrophobic monomers include ethylenically unsaturated hydrophobic monomers such as, for example, (meth)acrylate-containing hydrophobic monomers, N-alkyl (meth)acrylamide-containing hydrophobic monomers, alkyl vinylcarbonate-containing hydrophobic monomers, alkyl vinylcarbamate-containing hydrophobic monomers, fluoroalkyl (meth)acrylate-containing hydrophobic monomers, N-fluoroalkyl (meth)acrylamide-containing hydrophobic monomers, N-fluoroalkyl vinylcarbonate-containing hydrophobic monomers, N-fluoroalkyl vinylcarbamate-containing hydrophobic monomers, silicone-containing (meth)acrylate-containing hydrophobic monomers, (meth)acrylamide-containing hydrophobic monomers, vinyl carbonate-containing hydrophobic monomers, vinyl carbamate-containing hydrophobic monomers, styrenic-containing hydrophobic monomers, polyoxypropylene (meth)acrylate-containing hydrophobic monomers and the like and mixtures thereof. As used herein, the term "(meth)" denotes an optional methyl substituent. Thus, terms such as "(meth)acrylate" denotes either methacrylate or acrylate, and "(meth)acrylamide" denotes either methacrylamide or acrylamide.

In a non-limiting illustrative embodiment, the one or more hydrophobic monomers can be represented by the structure of Formula I.

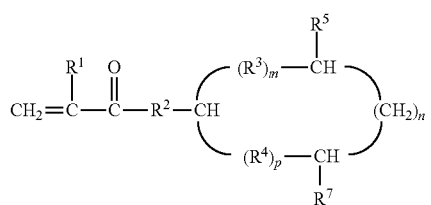

wherein $R^1$ is methyl or hydrogen; $R^2$ is —O— or —NH—; $R^3$ and $R^4$ are independently a divalent radical selected from the group consisting of —CH$_2$—, —CHOH— and —CHR$^6$—; $R^5$ and $R^6$ are independently a branched $C_3$-$C_8$ alkyl group; $R^7$ is hydrogen or —OH; n is an integer of at least 1, and m and p are independently 0 or an integer of at least 1, provided that the sum of m, p and n is 2, 3, 4 or 5.

Representative examples of one or more hydrophobic monomers represented by the structure of Formula I include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; 2-isohexyl-5-hydroxycyclopentyl methacrylamide, 4-t-butylcyclohexyl methacrylate, isobornyl methacrylate, adamantyl methacrylate, n-butyl methacrylate, n-hexyl methacrylate, lauryl methacrylate, benzyl methacrylate, and the like. In one embodiment, one or more hydrophobic monomers include compounds of Formula I wherein $R^3$ is —CH$_2$—, m is 1 or 2, p is 0, and the sum of m and n is 3 or 4.

In an illustrative embodiment, the one or more hydrophobic monomers will be present in the biomedical device-forming mixture in an amount ranging from about 0.5 to about 25 wt. %, based on the total weight of the mixture. In another illustrative embodiment, the one or more hydrophobic monomers will be present in the biomedical device-forming mixture in an amount ranging from about 1 to about 10 wt. %, based on the total weight of the biomedical device-forming mixture.

In non-limiting illustrative embodiments, the biomedical device-forming mixture further includes one or more crosslinking agents. Suitable crosslinking agents for use herein are known in the art. In illustrative embodiments, the one or more crosslinking agents are bi- or polyfunctional crosslinking agents comprising two or more reactive functional groups. In an embodiment, the one or more crosslinking agents have at least two polymerizable functional groups. Representative examples of crosslinking agents include divinylbenzene, allyl methacrylate, ethyleneglycol dimethacrylate, tetraethyleneglycol dimethacrylate, 1,4-butanediol diglycidyl ether, polyethyleneglycol dimethacrylate, vinyl carbonate derivatives of the glycol dimethacrylates, and methacryloxyethyl vinylcarbonate. However, other crosslinking agents are contemplated and the foregoing list is merely exemplary.

In illustrative embodiments, the one or more crosslinking agents are used in amounts of less than about 5 wt. %, and generally less than about 2 wt. %, e.g., from about 0.1 to about 5 wt. %, or from about 0.1 to about 2 wt. %, based on the total weight of the biomedical device-forming mixture.

In an illustrative embodiment, the biomedical device-forming mixture may further include one or more wetting agents. In one embodiment, suitable one or more wetting agents includes, for example, poly(vinyl alcohol) (PVA), poly(N-vinylpyrrolidone) (PVP), polymers containing carboxylic acid functionality, such as a polymer containing poly(acrylic acid) (PAA), copolymers of the foregoing and the like. Another suitable class of wetting agents includes non-polymeric wetting agents. Representative examples of such wetting agents include glycerin, propylene glycol, and other non-polymeric diols and glycols.

In an illustrative embodiment, the one or more wetting agents can be present in the biomedical device-forming mixture in an amount ranging from about 0 to about 10 wt. %, based on the total weight of the biomedical device-forming mixture. In another embodiment, the one or more wetting agents can be present in the biomedical device-forming mixture in an amount ranging from about 0.1 to about 10 wt. %, based on the total weight of the biomedical device-forming mixture. In yet another embodiment, the one or more wetting agents can be present in the biomedical device-forming mixture in an amount ranging from about 0.5 to about 5 wt. %, based on the total weight of the biomedical device-forming mixture.

In an illustrative embodiment, the biomedical device-forming mixture can further include one or more surfactants such as end terminal functionalized surfactants. A suitable end terminal functionalized surfactant includes, by way of example, one or more end terminal functionalized polyethers. Useful polyethers to be end terminal functionalized comprise one or more chains or polymeric components which have one or more (—O—R—) repeats units wherein R is an alkylene or arylene group having 2 to about 6 carbon atoms. The polyethers may be derived from block copolymers formed from different ratio components of ethylene oxide (EO) and propylene oxide (PO). Such polyethers and their respective component segments may include different attached hydrophobic and hydrophilic chemical functional group moieties and segments.

A representative example of a suitable polyether which can be end terminal functionalized is a poloxamer block copolymer. One specific class of poloxamer block copolymers are those available under the trademark Pluronic (BASF Wyandotte Corp., Wyandotte, Mich.). Poloxamers include Pluronics and reverse Pluronics. Pluronics are a series of ABA block copolymers composed of poly(ethylene oxide)-poly(propylene oxide)-poly(ethylene oxide) blocks as generally represented in Formula II:

$$HO(C_2H_4O)_a(C_3H_6O)_b(C_2H_4O)_aH \quad (II)$$

wherein a is independently at least 1 and b is at least 1.

Reverse Pluronics are a series of BAB block copolymers, respectively composed of poly(propylene oxide)-poly(ethylene oxide)-poly(propylene oxide) blocks as generally represented in Formula III:

$$HO(C_3H_6O)_b(C_2H_4O)_a(C_3H_6O)_bH \quad (III)$$

wherein a is at least 1 and b is independently at least 1. The poly(ethylene oxide), PEO, blocks are hydrophilic, whereas the poly(propylene oxide), PPO, blocks are hydrophobic in nature. The poloxamers in each series have varying ratios of PEO and PPO which ultimately determines the hydrophilic-lipophilic balance (HLB) of the material, i.e., the varying HLB values are based upon the varying values of a and b, a representing the number of hydrophilic poly(ethylene oxide) units (PEO) being present in the molecule and b representing the number of hydrophobic poly(propylene oxide) units (PPO) being present in the molecule.

Poloxamers and reverse poloxamers have terminal hydroxyl groups that can be terminal functionalized. An example of a terminal functionalized poloxamer and as discussed hereinbelow is poloxamer dimethacrylate (e.g., Pluronic® F127 dimethacrylate) as disclosed in U.S. Patent Application Publication No. 2003/0044468. Other examples include glycidyl-terminated copolymers of polyethylene glycol and polypropylene glycol as disclosed in U.S. Pat. No. 6,517,933.

Another example of a suitable polyether which can be end terminal functionalized is a poloxamine block copolymer. While the poloxamers and reverse poloxamers are considered to be difunctional molecules (based on the terminal hydroxyl groups), the poloxamines are in a tetrafunctional form, i.e., the molecules are tetrafunctional block copolymers terminating in primary hydroxyl groups and linked by a central diamine. One specific class of poloxamine block copolymers are those available under the trademark Tetronic (BASF). Poloxamines include Tetronic and reverse Tetronics. Poloxamines have the following general structure of Formula IV:

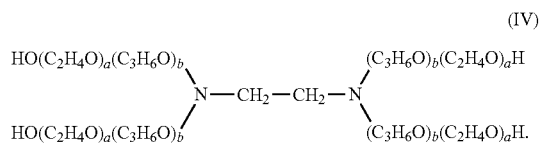

wherein a is independently at least 1 and b is independently at least 1.

The poloxamer and/or poloxamine is functionalized to provide the desired reactivity at the end terminal of the molecule. The functionality can be varied and is determined based upon the intended use of the functionalized PEO- and PPO-containing block copolymers. That is, the PEO- and PPO-containing block copolymers are reacted to provide end terminal functionality that is complementary with the intended device forming monomeric mixture. The term block copolymer as used herein shall be understood to mean a poloxamer and/or poloxamine as having two or more blocks in their polymeric backbone(s).

Generally, selection of the functional end group is determined by the functional group of the reactive molecule(s) in the mixture. For example, if the reactive molecule contains a carboxylic acid group, glycidyl methacrylate can provide a methacrylate end group. If the reactive molecule contains hydroxy or amino functionality, isocyanato ethyl methacrylate or (meth)acryloyl chloride can provide a methacrylate end group and vinyl chloro formate can provide a vinyl end group. A wide variety of suitable combinations of ethylenically unsaturated end groups and reactive molecules will be apparent to those of ordinary skill in the art. For example, the functional group may comprise a moiety selected from amine, hydrazine, hydrazide, thiol (nucleophilic groups), carboxylic acid, carboxylic ester, including imide ester, orthoester, carbonate, isocyanate, isothiocyanate, aldehyde, ketone, thione, alkenyl, acrylate, methacrylate, acrylamide, sulfone, maleimide, disulfide, iodo, epoxy, sulfonate, thiosulfonate, silane, alkoxysilane, halosilane, and phosphoramidate. More specific examples of these groups include succinimidyl ester or carbonate, imidazolyl ester or carbonate, benzotriazole ester or carbonate, p-nitrophenyl carbonate, vinyl sulfone, chloroethylsulfone, vinylpyridine, pyridyl disulfide, iodoacetamide, glyoxal, dione, mesylate, tosylate, and tresylate. Also included are other activated carboxylic acid derivatives, as well as hydrates or protected derivatives of any of the above moieties (e.g., aldehyde hydrate, hemiacetal, acetal, ketone hydrate, hemiketal, ketal, thioketal, thioacetal). Preferred electrophilic groups include succinimidyl carbonate, succinimidyl ester, maleimide, benzotriazole carbonate, glycidyl ether, imidazoyl ester, p-nitrophenyl carbonate, acrylate, tresylate, aldehyde, and orthopyridyl disulfide.

Representative examples of reaction sequences by which PEO- and PPO-containing block copolymers can be end-functionalized are provided below.

Bis-epoxide

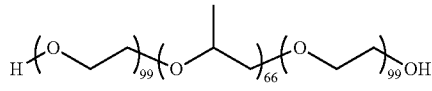

Pluronic F127

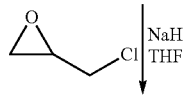

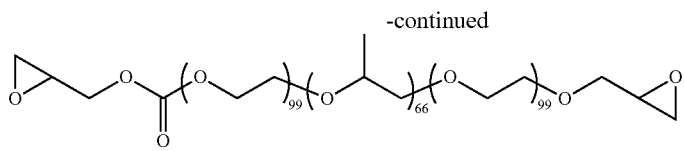

Pluronic bis-epoxide

Dimethacrylate

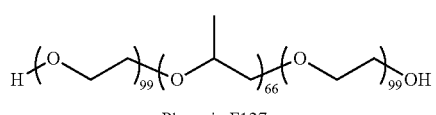

Pluronic F127

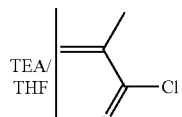

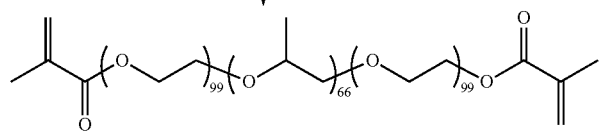

Pluronic F127 Dimethacrylate

Diisocyanate

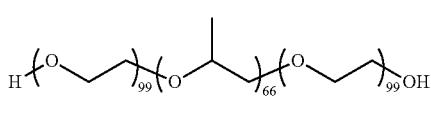

Pluronic F127

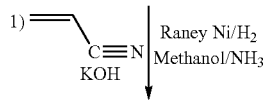

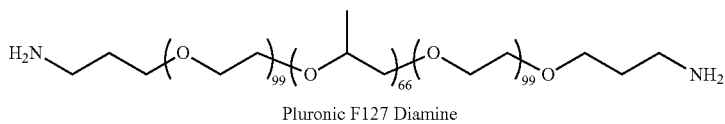

Pluronic F127 Diamine

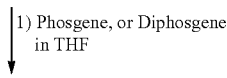

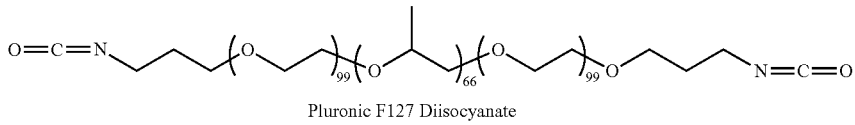

Pluronic F127 Diisocyanate

Further provided herein are certain exemplary, but non-limiting, examples of reactions for providing functionalized termini for PEO- and PPO-containing block copolymers. It is to be understood that one of ordinary skill in the art would be able to determine other reaction methods without engaging in an undue amount of experimentation. It should also be understood that any particular block copolymer molecule shown is only one chain length of a polydispersed population of the referenced material.

In an illustrative embodiment, the biomedical device-forming mixture includes one or more of PEO- and PPO-containing block copolymers. An example of such a copolymer that can be used in monomeric mixture is Pluronic® F127, a block copolymer having the structure [(polyethylene oxide)$_{99}$-(polypropylene oxide)$_{66}$-(polyethylene oxide)$_{99}$]. The terminal hydroxyl groups of the copolymer are functionalized to allow for the reaction of the copolymer with other ophthalmic device forming monomers. Another example includes Pluronic 407 dimethacrylate having the following structure

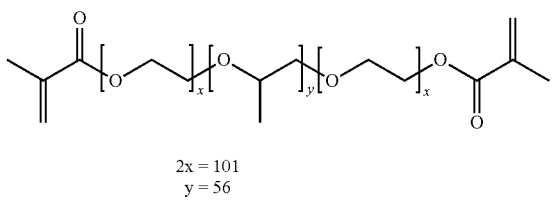

2x = 101
y = 56

In an illustrative embodiment, an end terminal functionalized surfactant is selected from the group consisting of poloxamers having at least one end terminal functionalized, reverse poloxamers having at least one end terminal functionalized, poloxamines having at least one end terminal functionalized, reverse poloxamines having at least one end terminal functionalized and mixtures thereof.

In an illustrative embodiment, the surfactants can be present in the biomedical device-forming mixture in an amount ranging from about 0.01 to about 20 wt. %, based on the total weight of the biomedical device-forming mixture. In another illustrative embodiment, the surfactants can be present in the biomedical device-forming mixture in an amount ranging from about 1 to about 10 wt. %, based on the total weight of the biomedical device-forming mixture.

In another illustrative embodiment, the biomedical device-forming mixture can further include one or more ultraviolet (UV) blockers. In one embodiment, useful UV blockers include one or more compounds of the following formula:

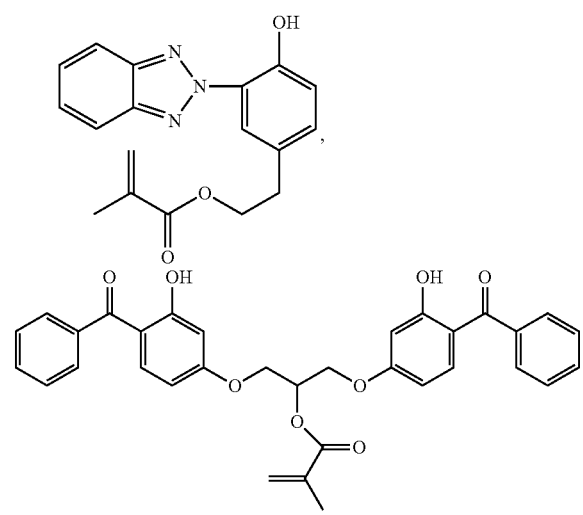

(2-Propenoic acid, 2-methyl,2-(4-benzoyl-3-hydroxyphenoxy)-1-[(4-benzoyl3-hydroxyphenoxy)methyl ester),

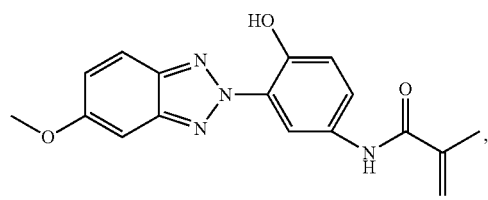

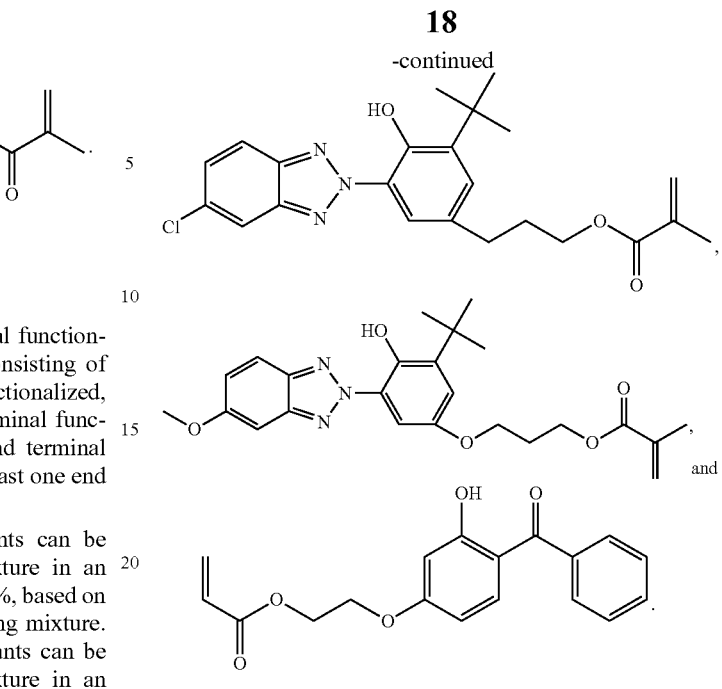

The biomedical device-forming mixtures disclosed herein may further contain, as necessary and within limits not to impair the purpose and effect of the illustrative embodiments disclosed herein, various additives such as an antioxidant, coloring agent, toughening agents and the like and other constituents as is well known in the art.

The biomedical devices of the illustrative embodiments, e.g., contact lenses or intraocular lenses, can be prepared by polymerizing the foregoing biomedical device-forming mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Alternately, the biomedical devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the monomeric mixture between two mold sections, one mold section shaped to form the anterior lens surface and the other mold section shaped to form the posterior lens surface, and curing the mixture while retained in the mold assembly to form a lens, for example, by free radical polymerization of the mixture.

Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarybutyl peroxypivalate, peroxydicarbonate, and the like. Representative UV initiators are those known in the art and include benzoin methyl ether, benzoin ethyl ether, Darocure® 1173, 1164, 2273, 1116, 2959, 3331 (EM Industries) and Irgacure® 651, 184 and 2959 (Ciba-Geigy), 2,2'Azobis(2-methylpropionitrile) (VAZO 64) and the like. Generally, the initiator will be employed in the mixture at a concentration of about 0.01 to about 5 percent by weight of the total mixture.

Polymerization is generally performed in a reaction medium, such as, for example, a solution or dispersion using a solvent, e.g., water or an alkanol containing from 1 to 4 carbon atoms such as methanol, ethanol or propan-2-ol. Alternatively, a mixture of any of the above solvents may be used.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

Polymerization of the mixtures will yield a polymer, that when hydrated, preferably forms a hydrogel. When producing a hydrogel lens, the mixture may further include at least a diluent that is ultimately replaced with water when the polymerization product is hydrated to form a hydrogel. The amount of diluent used should be less than about 50 wt. %, and in most cases, the diluent content will be less than about 30 wt. %. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol, glycerine, liquid poly(ethylene glycol), alcohols, alcohol/water mixtures, ethylene oxide/propylene oxide block copolymers, low molecular weight linear poly(2-hydroxyethyl methacrylate), glycol esters of lactic acid, formamides, ketones, dialkylsulfoxides, butyl carbitol, and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the monomeric mixtures to be polymerized may further include a monomer for increasing the refractive index of the resultant polymerized product. Examples of such monomers include aromatic (meth)acrylates, such as phenyl (meth)acrylate, 2-phenylethyl (meth)acrylate, 2-phenoxyethyl methacrylate, and benzyl (meth)acrylate.

The biomedical devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative. The examples should not be read as limiting the scope of the invention as defined in the claims.

Various polymerization products were formed as discussed below and characterized by standard testing procedures such as:

Water %: Two sets of six hydrated lenses or films are blotted dry on a piece of filter paper to remove excess water, and samples are weighed (wet weight). Samples are then placed in a microwave oven for 10 minutes inside ajar containing desiccant. The samples are then allowed to sit for 30 minutes to equilibrate to room temperature and reweighed (dry weight). The percent water is calculated from the wet and dry weights.

Contact Angle: Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70 to 72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high-speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

Modulus (g/mm$^2$) was measured per ASTM 1708 employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 100±50 microns.

Oxygen permeability (also referred to as Dk) was determined by the following procedure. The oxygen permeability of hydrogels is measured by the polarographic method (ISO 18369-4:2017, ANSI Z80.20-2016) using an O2 Permeometer Model 201T instrument (Createch, Albany, Calif. USA) having a probe containing a central, circular gold cathode at its end and a silver anode insulated from the cathode. Measurements are taken only on pre-inspected pinhole-free, flat silicone hydrogel film samples of four different center thicknesses ranging from 70 to 700 microns. Center thickness measurements of the film samples may be measured using a Rehder ET-1 electronic thickness gauge. Other methods and/or instruments may be used as long as the oxygen permeability values obtained therefrom are equivalent to the described method.

Generally, the film samples have the shape of a circular disk. Measurements are taken with the film sample and probe immersed in a bath containing circulating phosphate buffered saline (PBS) equilibrated at 35° C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. For silicone hydrogel films, it is frequently useful to employ a Teflon polymer membrane, e.g., having a circular disk shape, between the probe cathode and the film sample. In such cases, the Teflon membrane is first placed on the pre-moistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value.

At least two Dk measurements per thickness, and meeting $R^2$ value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−20% of the Repository values established by William J. Benjamin, et al., The Oxygen Permeability of Reference Materials, Optom Vis Sci 7 (12s): 95 (1997), the disclosure of which is incorporated herein in its entirety:

| Material Name | Repository Values | Lower Limit | Upper Limit |
| --- | --- | --- | --- |
| Fluoroperm 30 | 26.2 | 24 | 29 |
| Menicon EX | 62.4 | 56 | 66 |
| Quantum II | 92.9 | 85 | 101 |

In the examples, the following abbreviations are used.
HA: Hyaluronic acid
HA-MA: Methacrylated hyaluronic acid represented by the following structure:

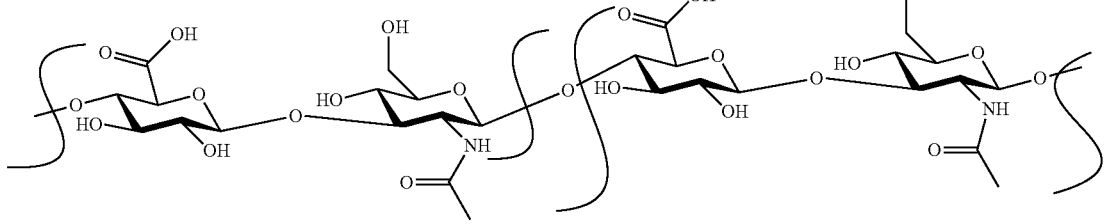

DMA: N,N-dimethylacrylamide
EGDMA: Ethylene glycol dimethacrylate
TEGDMA: Tetraethyleneglycol dimethacrylate
BDDE: 1,4-butanediol diglycidyl ether
Irgacure 2959: 2-Hydroxy-4'-(2-hydroxyethoxy)-2-methylpropiophenone
Irgacure 2959 (10% sln): 10% Irgacure 2959 in methanol
PVP: Polyvinylpyrrolidone (K90)
PAA: Polyacrylic acid (250 kDa Mw)
POx 200: Poly(2-ethyl-2-oxazoline) (200 kDa)
POx 500: Poly(2-ethyl-2-oxazoline) (500 kDa)
P407DM: Poloxamer 407 dimethacrylate having the following structure

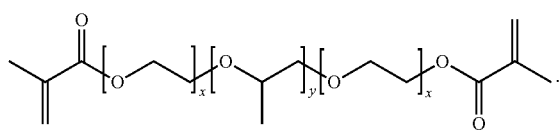

2x = 101
y = 56

Example 1

Preparation of a HA-MA.

1-Liter flask equipped with a stirbar was loaded with DI water (490 mL). HA (10 g, $M_n$~48 kDa) was dissolved in the stirring solution. A pH meter was immersed into the HA solution. Methacrylic anhydride (11.47 g, 74.3 mmol) was added into the solution at room temperature. The pH of the solution was maintained between 8.0~8.5 by adding an NaOH solution (20 wt. %) for 6 hours, then the solution was stirred overnight. The product was purified by dialysis (MWCO 6-8 kDa) against reverse osmosis (RO) water for two days followed by lyophilized for two days. The product was redissolved in 300 mL of de-ionized (DI) water and purified with dialysis and lyophilization again to afford white powder of HA-MA with 45% of methacrylate.

Example 2

Preparation of a HA-MA.

To a 1-Liter flask equipped with a stirbar was loaded with DI water (490 mL). HA (10 g, $M_n$~115 kDa) was dissolved in the stirring solution. A pH meter was immersed into the HA solution. Methacrylic anhydride (1.91 g, 12.4 mmol) was added into the solution at room temperature. The pH of the solution was maintained between 8.0 and 8.5 by adding an NaOH solution (20 wt. %) for 6 hours, then the solution was stirred overnight. The product was purified by dialysis (MWCO 6-8 kDa) against RO water for two days followed by lyophilized for two days. The product was redissolved in 300 mL of DI water and purified with dialysis and lyophilization again to afford a white powder of HA-MA with 10% of methacrylate.

Examples 3-7

Preparation of a Contact Lens.

The wetting agent solutions used in the examples below were prepared as follows. A 50 mL flask was charged with a stir bar, 3.5 g of the selected wetting agent (i.e., PAA, PVP, POx 200 and POx 500) and 16.5 g of purified $H_2O$. The flask was then placed on a stir plate and the mixture was stirred for at least 2 hours until the wetting agent was fully dissolved resulting in a 17.5% master batch solution that was stored until used.

Contact lenses were prepared using the reaction components listed in Table 2 below, as amounts per weight percent. The lenses were prepared by mixing the reaction components together in a scintillation vial with stirring or rolling for at least about 1 hour until all components were dissolved. The reaction mixture was then dispensed into a thermoplastic contact lens mold assembly and irradiated with UV light for 20 seconds to form a contact lens. The resulting lens were released from the mold, extracted with water for 3 minutes and placed into a buffered saline solution to remove residual monomers.

Once the lenses have been extracted, the lenses were placed into a vial or blister package that filled with a buffered saline. The vials or blisters were sealed with a stopper or foil and autoclaved for about 30 minutes at about 121° C. The properties of the resulting contact lenses are also shown below in Table 3.

TABLE 2

| Component (Wt. %) | Ex. 3 | Ex. 4 | Ex. 5 | Ex. 6 | Ex. 7 |
|---|---|---|---|---|---|
| DMA | 42.25 | 42.25 | 48.23 | 41.78 | 48.54 |
| TEGDMA | | | 1.93 | 2.22 | 2.5 |
| EGDMA | 1.13 | 1.13 | | | |
| BDDE | 1.69 | 1.69 | | | |
| Irgacure 2959 (10% sln) | 1.41 | 1.41 | 1.61 | | |
| Irgacure 2959 solid | | | | 0.27 | 0.32 |
| P407DM | | | | 13.93 | |
| Water | 11.27 | 11.27 | | | |
| 17.5% PVP solution | | | | 16.08 | 16.08 |
| 17.5% PAA solution | 14.08 | 14.08 | | | |
| 17.5% Polyoxazoline solution | | | | 13.93 | 16.1 |
| 2% HA-MA (Ex. 1) solution | 28.17 | | 32.15 | 27.85 | 32.36 |
| 2% HA-MA (Ex. 2) solution | | 28.17 | | | |

TABLE 3

| | Properties | | | | |
|---|---|---|---|---|---|
| | Ex. 3 | Ex. 4 | Ex. 5 | Ex. 6 | Ex. 7 |
| Modulus | 57 (3) | 25 (2) | 22 (1) | 49 (1) | 31 (5) |
| Tear | 2.2 | | | 2.3 | 1.8 |
| % WC | 85.3% | 86.7% | 86% | 82.7 | 84.8 |
| CBCA | 36 | 35 | 40 | | 37 |
| Dk | 72 | | 74 | 59 | 66 |

Examples 8-10

Preparation of a Contact Lens.

Contact lenses were prepared using the reaction components listed in Table 4 below, as amounts per weight percent. The lenses were prepared by mixing the reaction components together in a scintillation vial with stirring or rolling for at least about 1 hour until all components were dissolved. The reaction mixture was then dispensed into a thermoplastic contact lens mold assembly and irradiated with UV light for 20 seconds to form a contact lens. The resulting lens were released from the mold, extracted with water for 3 minutes and placed into a buffered saline solution to remove residual monomers.

Once the lenses have been extracted the lenses were placed into a vial or blister package that filled with a buffered saline. The vials or blisters were sealed with a stopper or foil and autoclaved for about 30 minutes at about 121° C. The properties of the resulting contact lenses are also shown below in Table 5.

TABLE 4

| Component (Wt. %) | Ex. 8 | Ex. 9 | Ex. 10 |
|---|---|---|---|
| DMA | 41.17 | 56.19 | 59.85 |
| EGDMA | 1.63 | 1.42 | 1.35 |
| Irgacure 2959 (10% sln) | | 1.16 | |
| Irgacure 2959 solid | 0.16 | | 0.59 |
| 20% P407DM solution in $H_2O$ | 18.66 | | |
| P407DM | | 2.28 | 5.23 |
| Water | 7.99 | 4.74 | |
| Propylene Glycol | | | 4.38 |

TABLE 4-continued

| Component (Wt. %) | Ex. 8 | Ex. 9 | Ex. 10 |
|---|---|---|---|
| 17.5% PVP solution in H$_2$O | | 11.34 | 9.62 |
| 17.5% PAA Solution | 10.11 | | |
| 2% HA-MA Ex. 1) solution in H$_2$O | 20.28 | 22.87 | 18.98 |

TABLE 5

| | Properties | | |
|---|---|---|---|
| | Ex. 8 | Ex. 9 | Ex. 10 |
| Modulus | 46 (3) | 43 (2) | 50 (1) |
| % WC | 83.5% | 83% | 83% |
| CBCA | 55 | 39 | — |
| Dk | 70 | 70 | — |

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

It will be understood that various modifications may be made to the embodiments disclosed herein. Therefore, the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A biomedical device comprising a polymerization product of a biomedical device-forming mixture comprising:
 (a) one or more grafted glycosaminoglycan polymers comprising a glycosaminoglycan having a polymer backbone and one or more side chains comprising an ethylenically unsaturated reactive-containing residue grafted onto the polymer backbone, and
 (b) one or more non-silicone biomedical device-forming monomers;
 wherein the biomedical device has an equilibrium water content of at least about 80 wt. % and an oxygen permeability (Dk) of at least about 60.

2. The biomedical device according to claim 1, wherein the glycosaminoglycan is selected from the group consisting of chondroitin, chondroitin sulfate, dermatan, dermatan sulfate, heparin, heparan sulfate, heparosan, hyaluronan, and hyaluronic acid or a salt thereof.

3. The biomedical device according to claim 1, wherein the one or more grafted glycosaminoglycan polymers have a degree of grafting ranging from about 2 to about 30%.

4. The biomedical device according to claim 1, wherein the ethylenically unsaturated reactive-containing residue is a methacrylate-containing residue.

5. The biomedical device according to claim 4, wherein the one or more grafted glycosaminoglycan polymers have a degree of methacrylation ranging from about 0.5 percent to about 50 percent.

6. The biomedical device according to claim 1, wherein the one or more non-silicone biomedical device-forming monomers are selected from the group consisting of an unsaturated carboxylic acid, an acrylamide, a vinyl lactam, a (meth)acrylic acid, a hydroxyl-containing-(meth)acrylate, a hydrophilic vinyl carbonate, a hydrophilic vinyl carbamate monomer, a hydrophilic oxazolone monomer, and mixtures thereof.

7. The biomedical device according to claim 1, wherein the biomedical device-forming mixture further comprises one or more crosslinking agents.

8. The biomedical device according to claim 1, wherein the biomedical device-forming mixture further comprises one or more components selected from the group consisting of a wetting agent, a surfactant and an ultraviolet (UV) blocker.

9. The biomedical device according to claim 1, wherein the biomedical device-forming mixture comprises:
 about 0.1 to about 2 wt. %, based on the total weight of the biomedical device-forming mixture, of the one or more grafted glycosaminoglycan polymers; and
 about 30 to about 90 wt. %, based on the total weight of the biomedical device-forming mixture, of the one or more non-silicone biomedical device-forming monomers.

10. The biomedical device according to claim 1, having a water content of at least about 80 wt. % to about 90 wt. % and an oxygen permeability (Dk) of at least about 60 to about 80.

11. The biomedical device according to claim 1, which is one of a contact lens, an intraocular lens and a hydrogel.

12. A method for making a biomedical device comprising:
 (a) providing a biomedical device-forming mixture comprising (i) one or more grafted glycosaminoglycan polymers comprising a glycosaminoglycan having a polymer backbone and one or more side chains comprising an ethylenically unsaturated reactive-containing residue grafted onto the polymer backbone, and (ii) one or more non-silicone biomedical device-forming monomers;
 (b) subjecting the mixture to polymerization conditions to provide a polymerized biomedical device; and
 (c) hydrating the polymerized biomedical device;
 wherein the biomedical device has an equilibrium water content of at least about 80 wt. % and an oxygen permeability (Dk) of at least about 60.

13. The method according to claim 12, wherein the glycosaminoglycan is selected from the group consisting of chondroitin, chondroitin sulfate, dermatan, dermatan sulfate, heparin, heparan sulfate, heparosan, hyaluronan, and hyaluronic acid or a salt thereof, and the one or more non-silicone biomedical device-forming monomers are selected from the group consisting of an unsaturated carboxylic acid, an acrylamide, a vinyl lactam, (meth)acrylic acid, a hydroxyl-containing-(meth)acrylate, a hydrophilic vinyl carbonate, a hydrophilic vinyl carbamate monomer, a hydrophilic oxazolone monomer, and mixtures thereof.

14. The method according to claim 12, wherein the ethylenically unsaturated reactive-containing residue is a methacrylate-containing residue, and the grafted glycosaminoglycan polymer has a degree of methacrylation ranging from about 0.5 percent to about 50 percent.

15. The method according to claim 12, wherein the biomedical device-forming mixture further comprises one or more crosslinking agents.

16. The method according to claim 12, wherein the biomedical device-forming mixture comprises:
   about 0.1 to about 2 wt. %, based on the total weight of the biomedical device-forming mixture, of the one or more grafted glycosaminoglycan polymers; and
   about 30 to about 90 wt. %, based on the total weight of the biomedical device-forming mixture, of the one or more non-silicone biomedical device-forming monomers.

17. The method according to claim 12, wherein the biomedical device is one of a contact lens, an intraocular lens and a hydrogel.

18. The biomedical device according to claim 1, wherein the glycosaminoglycan has a weight average molecular weight of from about 40,000 to about 3,000,000 Daltons.

19. The biomedical device according to claim 1, which is one of a contact lens, an intraocular lens and a hydrogel, and wherein the glycosaminoglycan is hyaluronic acid or a salt thereof, the ethylenically unsaturated reactive-containing residue is a methacrylate-containing residue, and the one or more non-silicone biomedical device-forming monomers are selected from the group consisting of an unsaturated carboxylic acid, an acrylamide, a vinyl lactam, (meth)acrylic acid, a hydroxyl-containing-(meth)acrylate, a hydrophilic vinyl carbonate, a hydrophilic vinyl carbamate monomer, a hydrophilic oxazolone monomer, and mixtures thereof.

20. The biomedical device according to claim 19, wherein the biomedical device-forming mixture further comprises one or more components selected from the group consisting of a wetting agent, a surfactant and an ultraviolet (UV) blocker.

* * * * *